F. F. SCOVILLE.
LOCOMOTIVE ENGINE.
APPLICATION FILED APR. 5, 1918.

1,275,612.

Patented Aug. 13, 1918.
8 SHEETS—SHEET 1.

WITNESSES

INVENTOR

UNITED STATES PATENT OFFICE.

FRANK F. SCOVILLE, OF SCHENECTADY, NEW YORK.

LOCOMOTIVE-ENGINE.

1,275,612.  Specification of Letters Patent.  Patented Aug. 13, 1918.

Application filed April 5, 1918. Serial No. 226,943.

*To all whom it may concern:*

Be it known that I, FRANK F. SCOVILLE, of Schenectady, in the county of Schenectady and State of New York, have invented a certain new and useful Improvement in Locomotive-Engines, of which improvement the following is a specification.

The object of my invention is to provide a construction which shall be readily and inexpensively applicable in locomotives of various standard types, by which the lateral deflection or offset of the draw pin, relatively to the center line of the track, in passing over curves, may be rendered practically negligible, with a consequent reduction of tendency to the derailment of the locomotive. My invention is also designed to combine in a single integral member, a plurality of hinged or floating parts which have heretofore been connected together, and thereby to reduce the amount of machine work and bolting common in present practice.

The improvement claimed is hereinafter fully set forth.

In the accompanying drawings.

Figure 1:
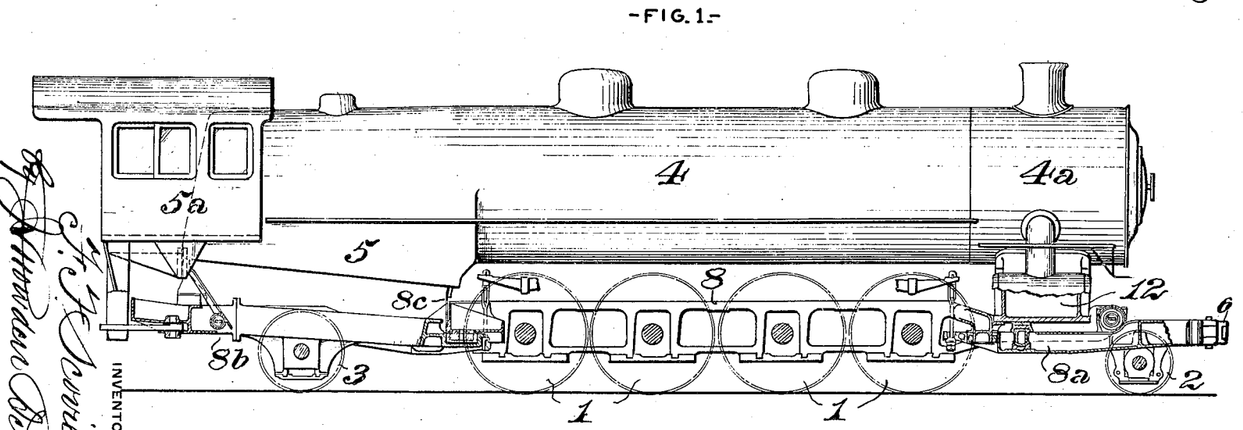
Figure 1 is a diagrammatic side view of a locomotive engine, illustrating an embodiment of my invention.

Referring descriptively to the specific embodiment of my invention which is herein exemplified, I provide, as its leading and characteristic feature, a supporting structure for the locomotive, which comprises a main frame, of the ordinary construction, connected, without capacity of relative lateral movement, to both ends of the boiler, 4, and a supplemental frame which is articulated to one end of the main frame, in such manner as to have the capacity of swiveling relatively thereto, in passing curves, as indicated in Fig. 1 and hereinafter more fully described. The supplemental frame is provided with draft and buffing appliances of any suitable and preferred construction, and may be connected to either end of the main frame, or, as in the instance examplified, both a front and a rear supplemental frame may be applied, said frames being herein designated, as entireties, by the reference symbols 8ª and 8ᵇ, respectively.

My invention is herein shown as applied in a locomotive engine having a main frame 8, of the standard bar type, to the forward end of which the cylinder saddles, 12, are secured in the ordinary manner. The smoke box, 4ª, of the boiler, 4, is rigidly connected to the cylinder saddles, and the firebox, 5, is attached to the rear end of the main frame by a furnace bearer plate, 8ᶜ, which is of sufficient flexibility to permit the longitudinal expansion and contraction of the boiler, under variations of temperature, without the imposition of strain upon it or its connections to the main frame. With this construction, it will be seen that the main frame extends for the entire distance between the smoke box and the fire box, to each of which it is fixed, and, consequently, that there is no capacity of relative lateral movement of the boiler and its support throughout this distance.

Figure 2:
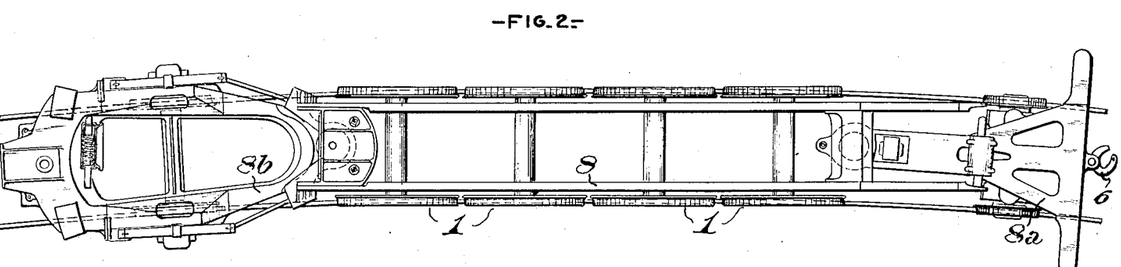
Fig. 2, a similar plan or top view, with the boiler and cab removed.

As shown in Figs. 1 and 2, a front supplemental frame, $8^a$, is articulated to the front end of the main frame 8, and a rear supplemental frame, $8^b$, is articulated to its rear end. The main frame is supported on eight driving wheels, 1; the front supplemental frame on two leading wheels, 2, and the rear supplemental frame on two trailing wheels, 3.

Figure 3:
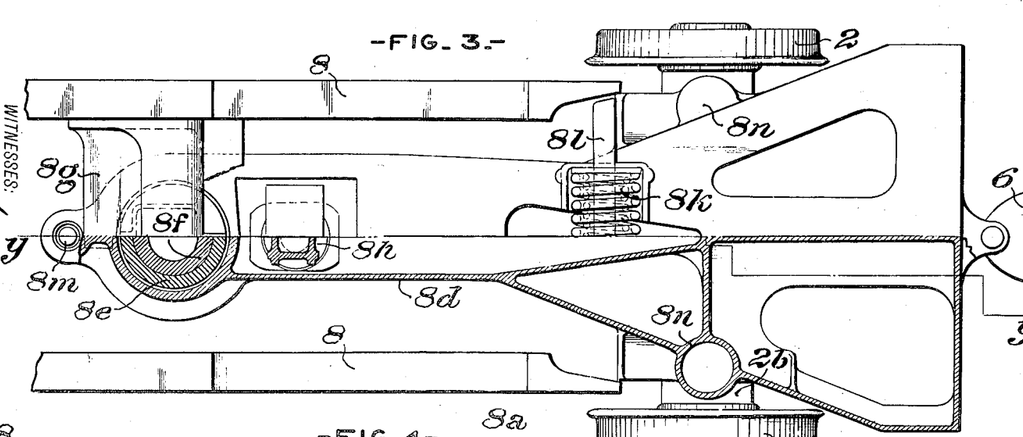
Fig. 3, a view, half in plan and half in horizontal section on the line $x$ $x$ of Fig. 4, of the articulated front frame thereof.
Figure 4:
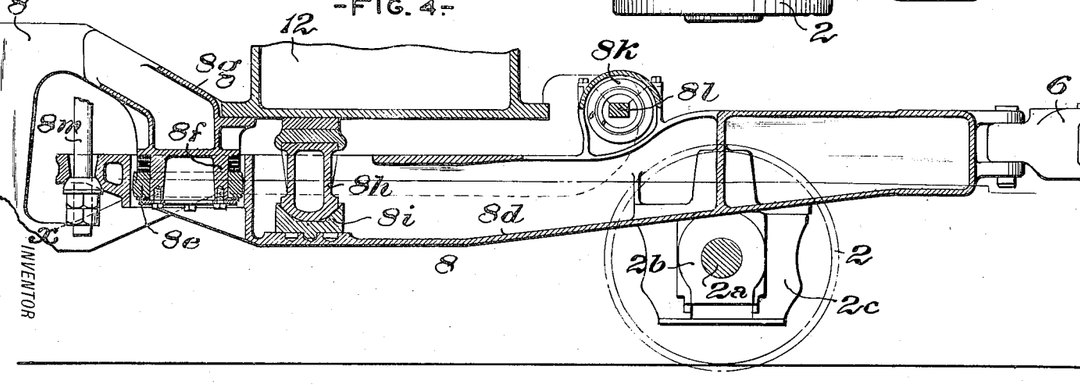
Fig. 4, a vertical longitudinal section, on the line $y$, $y$ of Fig. 3.

Referring first to Figs. 3 and 4, in which the front supplemental frame, $8^a$, is shown as supported on two leading wheels, 2, said frame is a substantially horizontal beam member, $8^d$, which extends longitudinally, in the middle plane of the locomotive, between the forward portions of the two side members of the main frame, 8, and combines, in an integral structure, the longitudinal rails, front rail, front bumper member, and equalizer, of an ordinary truck. The portion of the beam member which lies between the main frame members, is of hollow or box section, and its forward portion is extended laterally to a width greater than the distance over the main frame members, so as to be adapted to support a front bumper platform or deck. A suitable coupler head, 6, is pivoted to its front side. The beam, $8^d$, is articulated to the main frame, 8, by being pivoted, near its end, in the central plane of the locomotive, on a bearing ring, $8^e$, fitted on a hollow center pin, $8^f$, which is formed at the bottom of a cross bearer casting, $8^g$, secured to the side members of the main frame, 8. The periphery of the bearing ring, $8^e$, is finished spherically, to permit vertical oscillatory movement of the beam, $8^d$, without impairing its pivotal relation to the center pin, $8^f$, in which movement it swings on the segmentally formed lower surface of a transversely extending bearing, $8^h$, connected to the bottom of the cylinder saddles, 12, and fitting on a correspondingly formed seat, $8^i$, on the beam, $8^d$. The center pin, $8^f$, performs the additional function of a draw pin for the front supplemental frame and any coupling load connected thereto. The supplemental frame, $8^a$, is centered, in its movements about the axis of the pin, $8^f$, by a transverse centering spring, $8^k$, fitted on thrust bars, $8^l$, and bearing, at its ends, on the side members of the main frame, the centering spring, abutting, at its ends, on bearings on the beam, $8^d$. The rear end of the beam is coupled, by a vertical rod $8^m$, to the spring arrangement of the front driving wheels. It will be seen that, in operation, the coupler head is maintained in substantially the central plane of the track in passing curves, as well as on tangents, instead of swinging outwardly on curves as in ordinary practice.

The leading wheels, 2, of the front supplemental frame, are secured on an axle, $2^a$, fitted in journal boxes, $2^b$, located in pedestals, $2^c$, depending from the sides of the beam, $8^d$, in which sockets, $8^n$, are formed to serve as spring seats for the upper ends of springs, which may be applied on the tops of the journal boxes, in the usual manner.

Figure 5:
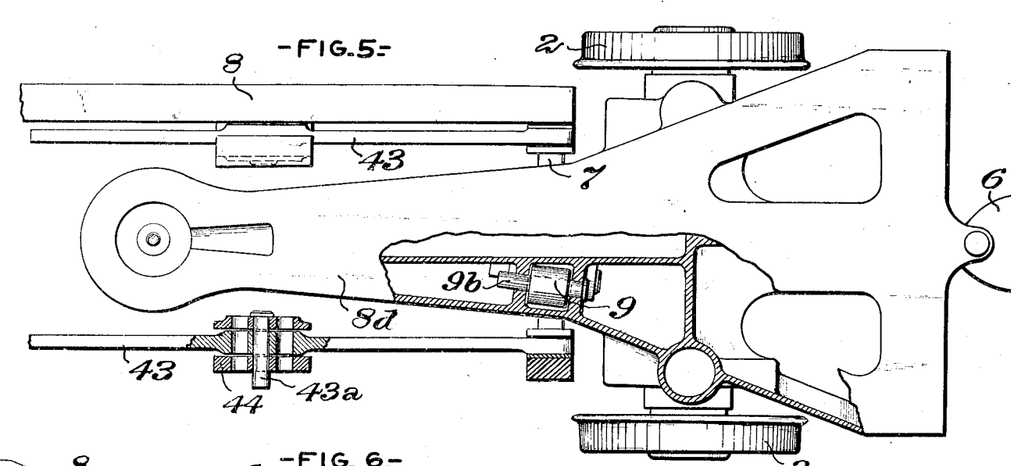
Fig. 5, a view, partly in plan and partly in horizontal section, showing a structural modification of the articulated front frame.
Figure 6:
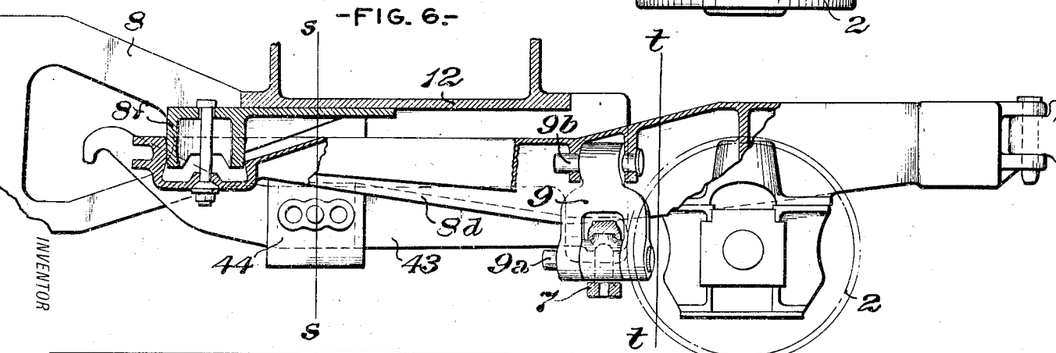
Fig. 6, a view, partly in side elevation and partly in vertical longitudinal central section, of the same.

Figs. 5 and 6 illustrate a structural modification, in which the horizontal beam member, $8^d$, does not perform the function of an equalizer as is done in the construction shown in Figs. 3 and 4, and above described. In this instance, the transmission of weight between the front supplemental frame and the spring arrangement of the driving wheels is effected by two equalizers, 43, which extend longitudinally, adjacent to the side members of the main frame, 8, and are pivoted thereto by fulcrum pins, $43^a$, fitted in bearings, 44, secured to the main frame members. The forward ends of the equalizers are coupled to the ends of a transverse beam, 7, which is, in turn, coupled, by pins, $9^a$, to the lower ends of a pair of inclined swing hangers, 9. The upper ends of said swing hangers are coupled, by pins, $9^b$, to the beam member, $8^d$. As in the construction of Figs. 3 and 4, the front supplemental frame swivels about the axis of a center pin, $8^f$, secured to the main frame, 8, in this instance through the intermediation of the cylinder saddles, 12, the periphery of said pin presenting an approximately spherically formed surface, to permit variation in the plane of movement of the main frame about the center pin. No centering spring is necessary in this construction, the swing links being inclined and centering the supplemental frame by gravity.

Figures 7, 8, 9:
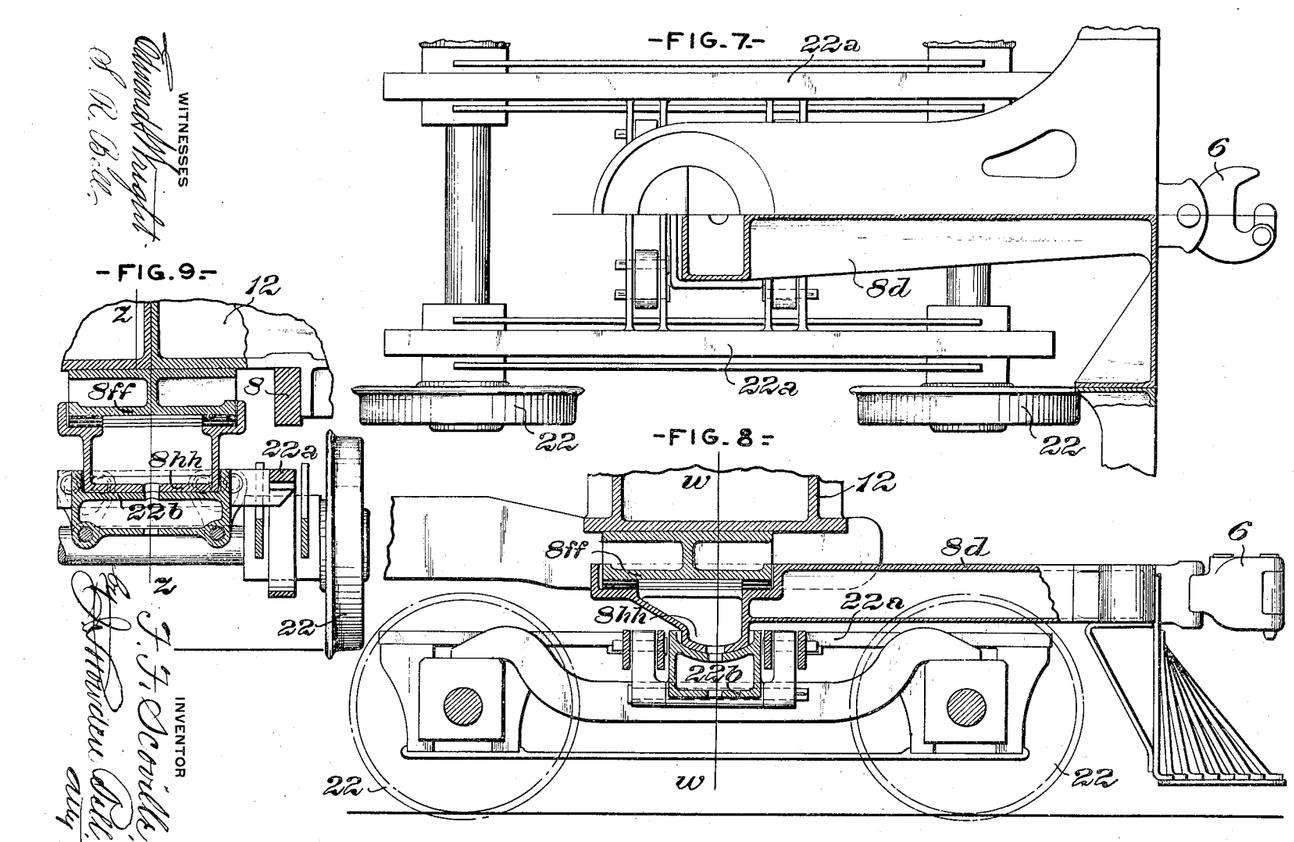
Fig. 7, a view, half in plan and half in horizontal section, showing an articulated front frame mounted on a four wheeled truck.
Fig. 8, a vertical longitudinal section through the same; on the line $z$ $z$ of Fig. 9.
Fig. 9, a vertical transverse section, on the line $w$ $w$ of Fig. 8.

In the structural modification shown in Figs. 7 to 9 inclusive, the front supplemental frame consists, as before, of a horizontal beam member, $8^d$, and is supported on a four wheeled truck, the wheels, 22, of which are journaled in a truck frame, $22^a$ of any suitable and preferred construction. The beam member, $8^d$, is, in this instance, coupled to the main frame, 8, by being pivoted on a center pin $8^{ff}$, which is in the form of a circular plate, secured to the bottom of the cylinder saddles, 12. The portion of the beam member which surrounds the center pin casting is prolonged downwardly and forms a curved bottomed rocker, $8^{hh}$, which fits a corresponding seat, $22^b$, on the swing bolster of the truck frame. The load on the truck is balanced by setting the center pin sufficiently back of the bearing of the swiveling front supplemental frame on the truck to offset the weight overhanging at its front. A cylindrical bearing on the truck bolster prevents lateral displacement of the coupler relatively to the truck, and the longitudinal rocking of the truck frame, due to uneven track, is provided for.

Figure 10:
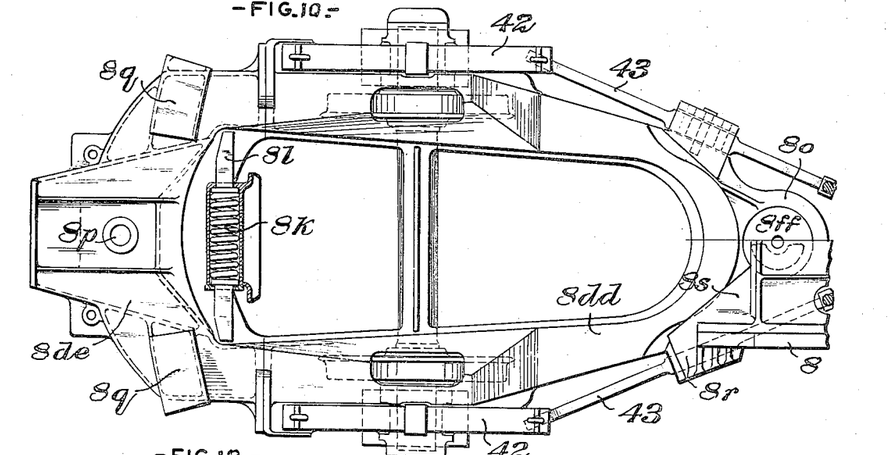
Fig. 10, a plan or top view of the articulated rear frame shown in Fig. 1.
Figure 11:
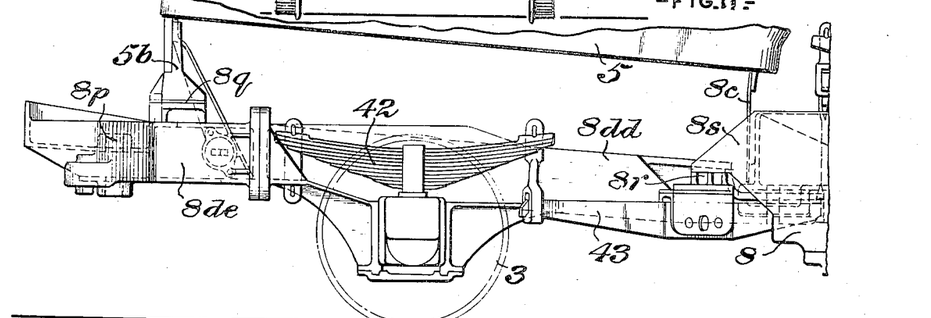
Fig. 11, a side view, in elevation, of the same.
Figure 12:
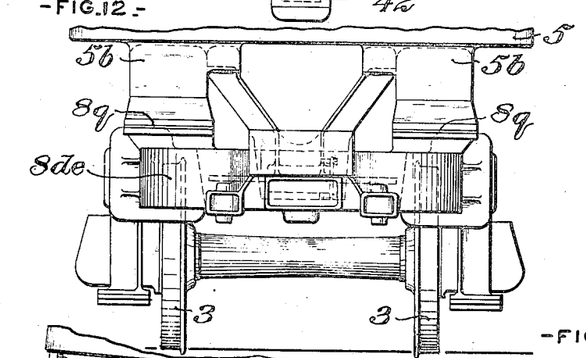
Fig. 12, a rear view.
Figure 13:
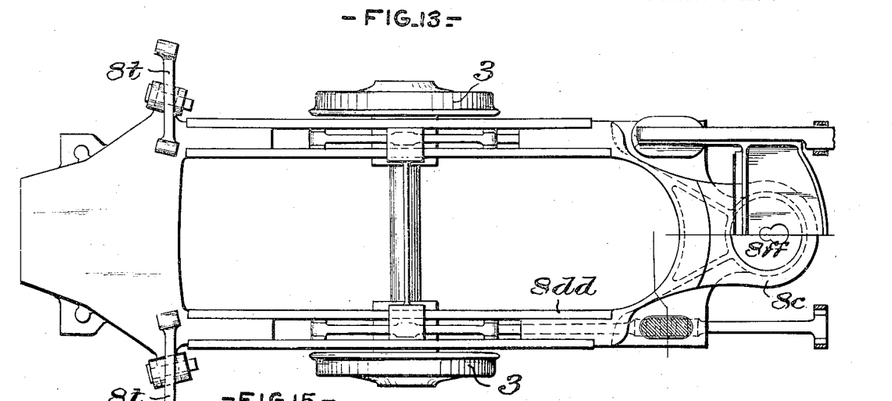
Fig. 13, a plan view, illustrating a structural modification of the articulated rear frame.
Figure 14:
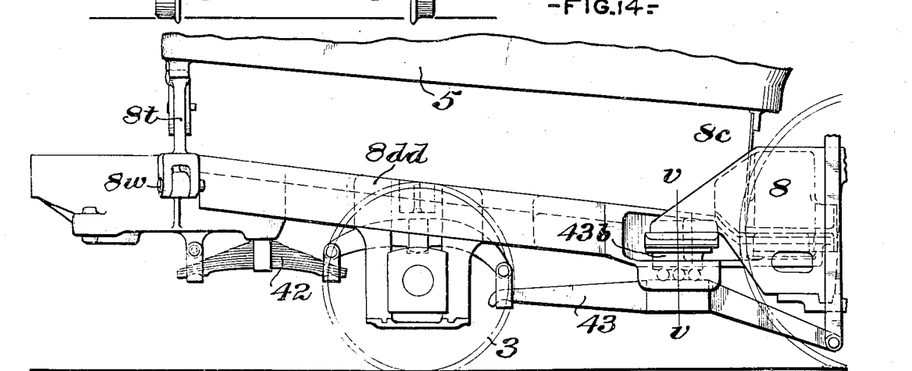
Fig. 14, a side view, in elevation, of the same.
Figure 15:
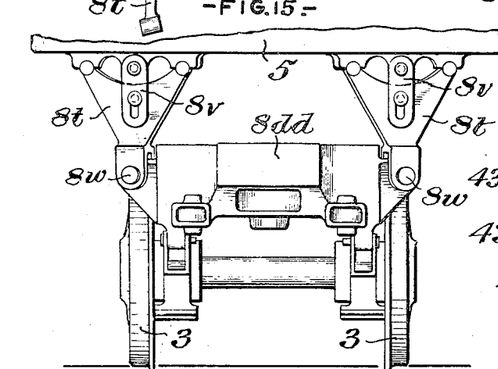
Fig. 15, a rear view.
Figure 16:
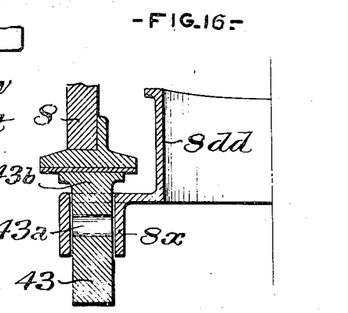
Fig. 16, a half vertical transverse section, on an enlarged scale, on the line $v$ $v$ of Fig. 14.
Figure 17:
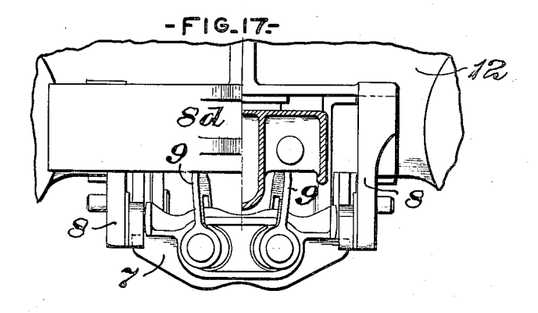
Fig. 17, a front view, partly in section on the line $t$ $t$ of Fig. 6, showing the transverse beam and related members of the articulated front frame construction illustrated in Figs. 5 and 6.
Figure 18:
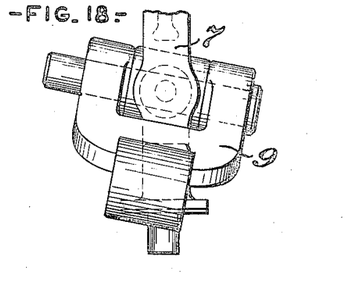
Fig. 18, a half plan view of the same.
Figure 19:
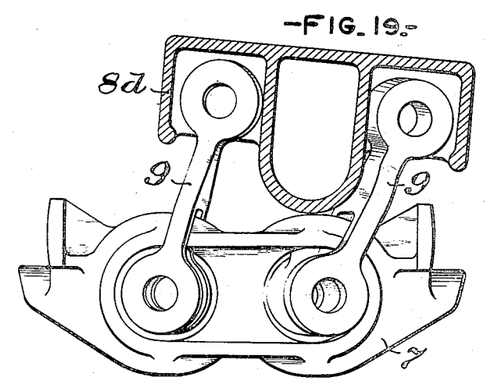
Fig. 19, a front view, on an enlarged scale, of the transverse beam, showing the swing hangers in position when passing a curve.
Figure 20:
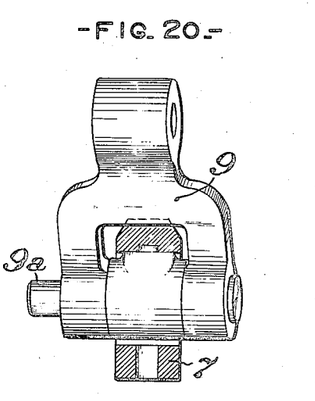
Fig. 20, a side view of a swing hanger, with the transverse beam in section.
Figure 21:
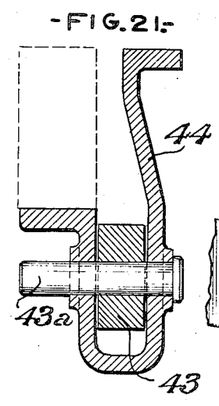
Fig. 21, a section through one of the equalizer fulcrum bearings, on the line $s$ $s$ of Fig. 6.
Figure 22:
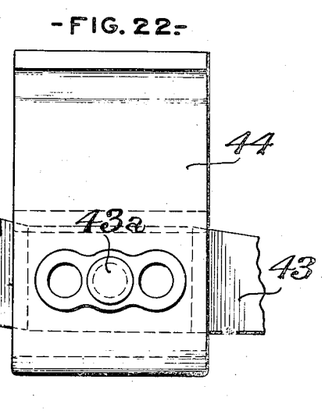
Fig. 22, a side view of the same.

The rear supplemental frame of Figs. 1 and 2 is shown in fuller detail in Figs. 10 to 12 inclusive. This frame is similar to the front supplemental frame before described, in the essential particular of consisting of an integral horizontal member $8^{dd}$, which is supported on a single pair of wheels, 3. The frame $8^{dd}$ is articulated to the main frame, 8, in any suitable and preferred manner, as by a center pin or cylindrical center casting, $8^{tt}$, which also performs the function of a draft pin, and is secured to the main frame, and engaged by an annular bearing, $8^o$, at the forward end of the supplemental frame. A coupling pin socket, $8^p$, is formed near the rear end of the supplemental frame, and seats, $8^q$, are formed on the top of said frame, upon which, firebox supports $5^b$, secured to the mud ring of the firebox, 5, rest, with the capacity of relative lateral movement. The springs, 42, of the wheels, 3, which support the rear supplemental frame, are coupled, by equalizers, 43, to the spring arrangement of the rear driving wheels. The springs and equalizers swing with the supplemental frame, and the springs thereby maintain their central positions over the journal boxes, in the movements of said frames. The supplemental frame is centered by a transverse centering spring, $8^x$, fitted on a thrust bar, 81, and operating similarly to that shown in Figs. 3 and 4.

The load at the middle points of the equalizers is taken directly to the main frame, by extensions, $8^r$, of the filling casting, $8^s$, which supports the firebox and the pivot, $8^{tt}$, of the supplemental frame. Said frame is, in this instance, of a two piece construction, having a transverse rear member, $8^{de}$, which is bolted to the rear ends of the U shaped main body of the frame, behind the springs, but the frame may, if preferred, be integral. By adopting a center plate form of pivot, instead of the jaw and pin type, the rear supplemental frame may be dropped and run out from the locomotive, just as an ordinary truck is handled.

Figs. 13 to 16 inclusive, illustrate a construction of rear supplemental frame suited for inside axle bearings, and which may be built, partly of cast, and partly of rolled material. It is articulated to the main frame, 8, in the same manner as in the construction last above described, but supports the rear end of the firebox, 5, through the intermediation of rockers, $8^t$, upon the tops of which the firebox rests at two points, and which are coupled, at their lower ends to the horizontal beam member $8^{dd}$, by pins, $8^w$. Safety links, $8^v$, coupled to the mud ring of the firebox and to the rockers, prevent undue lateral movement of the latter. The rockers effect the centering of the supplemental frame by gravity and a centering spring is therefore dispensed with. The fulcrum pins, $43^a$, of the equalizers, 43, bear on fulcrum blocks, $43^b$, which vibrate vertically in slotted guides, $8^x$, on the beam member, $8^{dd}$, and bear on the main frame members, 8. By this construction, which is also adaptable in connection with outside bearing supporting wheels, the supplemental frame is subjected to lateral strains only from the equalizers.

Figures 23, 24:
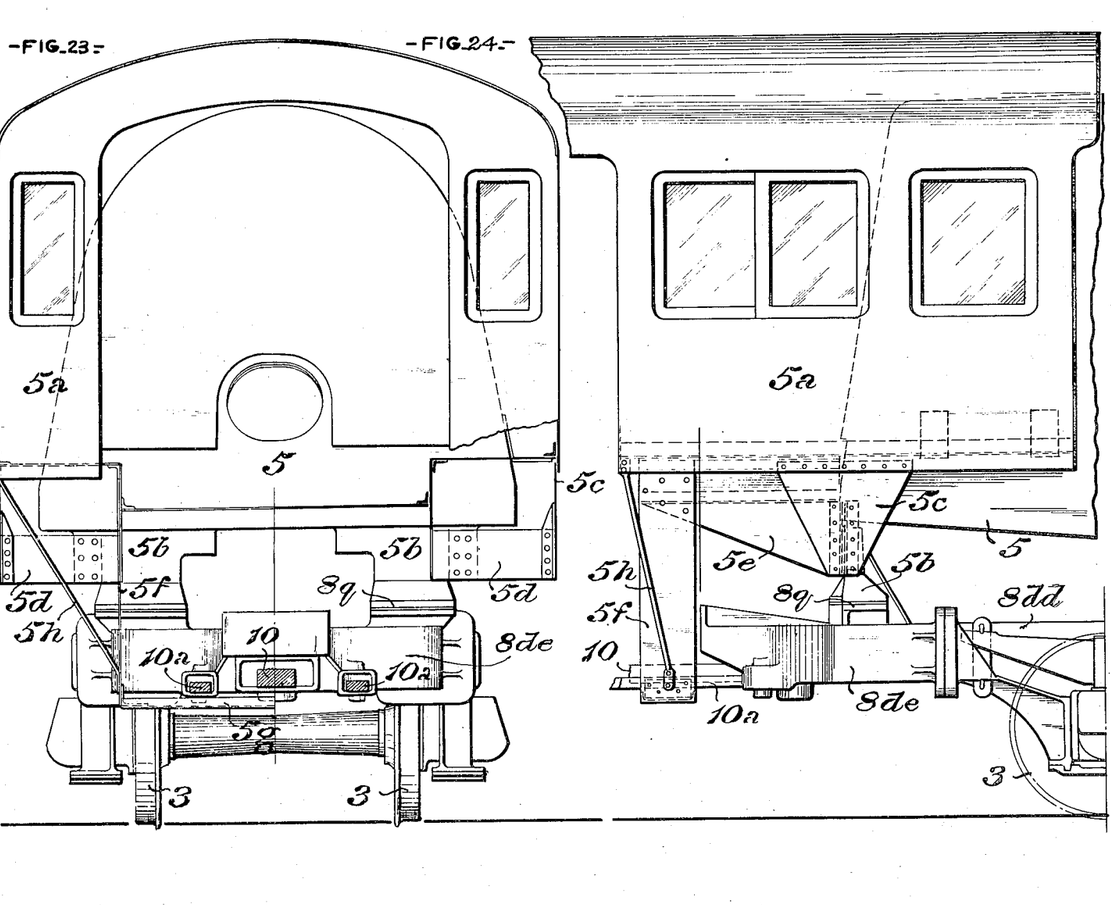
Fig. 23, a rear end view of the cab and its supports.
Fig. 24, a side view of the same.

The means by which the cab of the locomotive is supported entirely on the boiler, are shown in Figs. 23 and 24. Vertical longitudinally extending plates, $5^c$, are secured, by transverse plates, $5^d$, to projections depending from the mud ring of the firebox, 5, the firebox supports, $5^b$, before described, being, in the instance shown, utilized. The plates, $5^c$, are secured, at their tops, to the side plates of the cab, and rearwardly projecting plates, $5^e$, are also secured to the plates, $5^c$, and the cab plates. The cab may also be permitted to bear on the rear supplemental frame, if desired, by applying another sliding bearing at the rear of the latter. The tender draw bar, 10, and lateral safety draw bars, $10^a$, may also be supported by plates, $5^f$, extending downwardly from the cab, at its end, connected, at their lower ends, by a stiff transverse plate, $5^g$, passing under the draw bars, the plates, $5^f$, being prevented from swinging laterally by diagonal braces, $5^h$. The plate, $5^g$, may also serve to support the piping for brake mechanism, or injectors or other details.

I claim as my invention and desire to secure by Letters Patent:

1. The combination, in a locomotive engine, of a main frame; wheels supporting said frame; a boiler, connected, at each of its ends, to said frame; a supplemental frame, articulated to the main frame, adjacent to one of its ends; an axle journaled in said supplemental frame, independently of the main frame; wheels fixed on said axle; and a draft appliance, connected to said supplemental frame.

2. The combination, in a locomotive engine, of a main frame; wheels supporting said frame; a boiler, connected, at each of its ends, to said frame; supplemental frames, articulated to the main frame, adjacent to its front and rear ends, respectively; axles journaled in said supplemental frames, independently of the main frame; wheels fixed on said axles; and draft appliances, connected to said supplemental frames.

3. The combination, in a locomotive engine, of a main frame; wheels supporting said frame; a boiler, connected, at each of its ends, to said frame; an integral supplemental frame, articulated to the main frame, adjacent to one of its ends; an axle journaled in said supplemental frame, independently of the main frame; wheels fixed on said axle; and a draft appliance, connected to said supplemental frame.

4. The combination, in a locomotive engine, of a main frame; wheels supporting said frame; a boiler connected, at each of its ends, to said frame; a supplemental frame, articulated to the main frame, adjacent to one of its ends; a truck, supporting said supplemental frame, and having its axle or axles journaled therein, independently of the main frame; and a draft appliance, connected to said supplemental frame.

5. The combination, in a locomotive engine, of a main frame; wheels supporting said frame; a boiler, connected, at each of its ends, to said frame; a supplemental frame, articulated to the main frame, adjacent to one of its ends; wheels supporting said supplemental frame; means for effecting the transmission of imposed weight between said wheels and the wheels supporting the main frame; and a draft appliance connected to the supplemental frame.

6. The combination, in a locomotive engine, of a main frame; wheels supporting said frame; a boiler, connected, at each of its ends, to said frame; a supplemental frame, articulated to the main frame, adjacent to one of its ends; wheels supporting said supplemental frame; means coupling the supplemental frame to the spring arrangement of the wheels supporting the main frame, and serving to transmit imposed weight between the main and supplemental frames; and a draft appliance, connected to the supplemental frame.

7. The combination, in a locomotive engine, of a main frame; wheels supporting said frame; a boiler, connected, at each of its ends, to said frame; a supplemental frame, articulated to the main frame, adjacent to one of its ends; wheels supporting said supplemental frame; an equalizer, mounted on the supplemental frame and coupled to the spring arrangement of the wheels supporting the main frame; and a draft appliance connected to the supplemental frame.

8. The combination, in a locomotive engine, of a main frame; wheels supporting said frame; a boiler, connected, at each of its ends, to said frame; a supplemental frame, articulated to the main frame, adjacent to one of its ends; an axle journaled in said supplemental frame, independently of the main frame; wheels fixed on said axle; means for automatically centering the supplemental frame, relatively to the main frame; and a draft appliance, connected to the supplemental frame.

9. The combination, in a locomotive engine, of a main frame; wheels supporting said frame; a boiler, connected, at each of its ends to the main frame; a supplemental frame, articulated to the main frame, adjacent to one of its ends; wheels supporting said supplemental frame; means for transmitting weight from the boiler to the supplemental frame; and a draft appliance connected to the supplemental frame.

10. The combination, in a locomotive engine, of a main frame; wheels supporting said frame; a boiler, connected, at each of its ends, to the main frame; a supplemental frame, articulated to the main frame, adjacent to its rear end; wheels supporting said supplemental frame; means for supporting the boiler firebox on said supplemental frame, with the capacity of relative lateral movement; and a draft appliance connected to the supplemental frame.

11. The combination, in a locomotive engine, of a main frame; wheels supporting said frame; a boiler, connected, at each of its ends, to the main frame; an engineer's cab, connected to and supported on the boiler; a supplemental frame, articulated to the main frame, adjacent to its rear end; wheels supporting said supplemental frame, means for supporting the boiler firebox on said supplemental frame, with the capacity of relative lateral movement; and a draft appliance connected to the supplemental frame.

12. The combination, in a locomotive engine, of a main frame; wheels supporting said frame; a boiler, connected, at each of its ends, to the main frame; an engineer's cab connected to the boiler; a supplemental frame, articulated to the main frame, adjacent to its rear end; wheels supporting said supplemental frame; means for supporting the boiler firebox on said supplemental frame, with the capacity of relative lateral movement; a rear support, connected to the cab, for draft appliances and other rearwardly projecting members; and a draft appliance connected to the supplemental frame.

FRANK F. SCOVILLE.

Witnesses:
MABEL SCOVILLE,
DAVID SHIRRELL.